US012242571B2

(12) United States Patent
Shao et al.

(10) Patent No.: US 12,242,571 B2
(45) Date of Patent: Mar. 4, 2025

(54) METHODS AND SYSTEMS FOR REGIONAL POPULATION MANAGEMENT IN SMART CITIES BASED ON THE INTERNET OF THINGS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN); Haitang Xiang, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 375 days.

(21) Appl. No.: 17/809,270

(22) Filed: Jun. 27, 2022

(65) Prior Publication Data
US 2023/0376568 A1 Nov. 23, 2023

(30) Foreign Application Priority Data
May 18, 2022 (CN) .......................... 202210538983.9

(51) Int. Cl.
*G06F 18/22* (2023.01)
*G06F 18/23* (2023.01)
(Continued)

(52) U.S. Cl.
CPC .............. *G06F 18/22* (2023.01); *G06F 18/23* (2023.01); *G06F 18/24147* (2023.01);
(Continued)

(58) Field of Classification Search
CPC .... G06F 18/22; G06F 18/24147; G06F 18/23; G16Y 40/20; G16Y 20/10
See application file for complete search history.

(56) References Cited

FOREIGN PATENT DOCUMENTS

| CN | 110298483 A | * | 10/2019 | ............. G06Q 10/04 |
| CN | 112990530 A | * | 6/2021 | ............. G06N 3/045 |
| CN | 113421016 A | * | 9/2021 | |

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Natalie Huls
*Assistant Examiner* — Nyla Gavia
(74) *Attorney, Agent, or Firm* — METIS IP LLC

(57) ABSTRACT

The present disclosure provides a method for regional population management in smart cities based on an Internet of Things (IoT). The method includes obtaining population-related data in a historical target time period through an object platform based on a sensor network platform, predicting the a number of children population in a future target time period based on the population-related data, determining a construction plan of children's management institutions based on the number of children population, the construction plan including a number of the children's management institutions, and feeding back the construction plan to a user through a user platform based on a service platform.

11 Claims, 8 Drawing Sheets

(51) Int. Cl.
*G06F 18/2413* (2023.01)
*G16Y 10/60* (2020.01)
*G16Y 20/10* (2020.01)
*G16Y 40/10* (2020.01)
*G16Y 40/20* (2020.01)

(52) U.S. Cl.
CPC .............. *G16Y 40/20* (2020.01); *G16Y 10/60* (2020.01); *G16Y 20/10* (2020.01); *G16Y 40/10* (2020.01)

(56) References Cited

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
Zeng, Yeshuai, Research on The Allocation of Preschool Education Resources in Chongqing Based on Population Forecast, Full-text Database of China's Excellent Master's Thesis, Social Sciences Series II, 2021, 74 pages.

* cited by examiner

500

700

```
┌─────────────────────────────────────────────┐
│  Predicting a number of school-age children │  ╭710
│  population of the a target area in a second│
│  future time period based on the            │
│  population-related data                    │
└─────────────────────────────────────────────┘
                       │
                       ▼
┌─────────────────────────────────────────────┐
│  Determining a school construction plan of  │  ╭720
│  the target area based on the number of     │
│  school-age children population of the      │
│  target area in a second future time period │
└─────────────────────────────────────────────┘
```

FIG. 7

METHODS AND SYSTEMS FOR REGIONAL POPULATION MANAGEMENT IN SMART CITIES BASED ON THE INTERNET OF THINGS

CROSS-REFERENCE TO RELATED APPLICATIONS

This application claims priority of Chinese Patent Application No. 202210538983.9, filed on May 18, 2022, the entire contents of which are incorporated herein by reference.

TECHNICAL FIELD

This present disclosure involves the field of the Internet of Things (IoT) and the cloud platform, and especially involves a method and system for regional population management in smart cities based on an Internet of Things.

BACKGROUND

With the development of science and technology and the progress of society, the increasingly complicated education environment causes children need to be effectively supervised. Due to the lack of clear sorting and predictions of population data, there is greater blindness in the construction of children's management institutions, so it is inevitable that construction omissions may occur, which increases the burden on children's supervision.

Therefore, it is desirable to provide a method and a system for regional population management in smart cities based on the Internet of Things (IoT), a number of children population is predicted in a future target time period by obtaining population-related data in a historical target time period, so as to better determine a construction plan of the children's management institutions.

SUMMARY

Some embodiments of the present disclosure provide a method for regional population management in smart cities based on the Internet of Things (IoT). The method includes: obtaining population-related data in a historical target time period through an object platform based on a sensor network platform, predicting a number of children population in a future target time period based on the population-related data, determining a construction plan of children's management institutions based on the number of children population, the construction plan including a number of the children's management institutions, and feeding back the construction plan to a user through a user platform based on a service platform.

Some embodiments of the present disclosure provide a system for regional population management in smart cities based on the Internet of Things (IoT). The system includes a user platform, a service platform, a management platform, a sensor network platform, and an object platform. The management platform is configured to perform operations including: obtaining population-related data in a historical target time period through the object platform based on the sensor network platform, predicting a number of children population in a future target time period based on the population-related data, determining a construction plan of children's management institutions based on the number of children population, the construction plan including a number of the children's management institutions, and feeding back the construction plan to a user through a user platform based on a service platform.

Some embodiments of the present disclosure provide a non-transitory computer-readable storage medium for storing computer instructions, when reading the computer instructions in the storage medium, a computer implements a method for regional population management in smart cities based on an Internet of Things (IoT) according to claim 1.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for determining a school construction plan according to some embodiments of the present disclosure;

DETAILED DESCRIPTION

Figure 1:
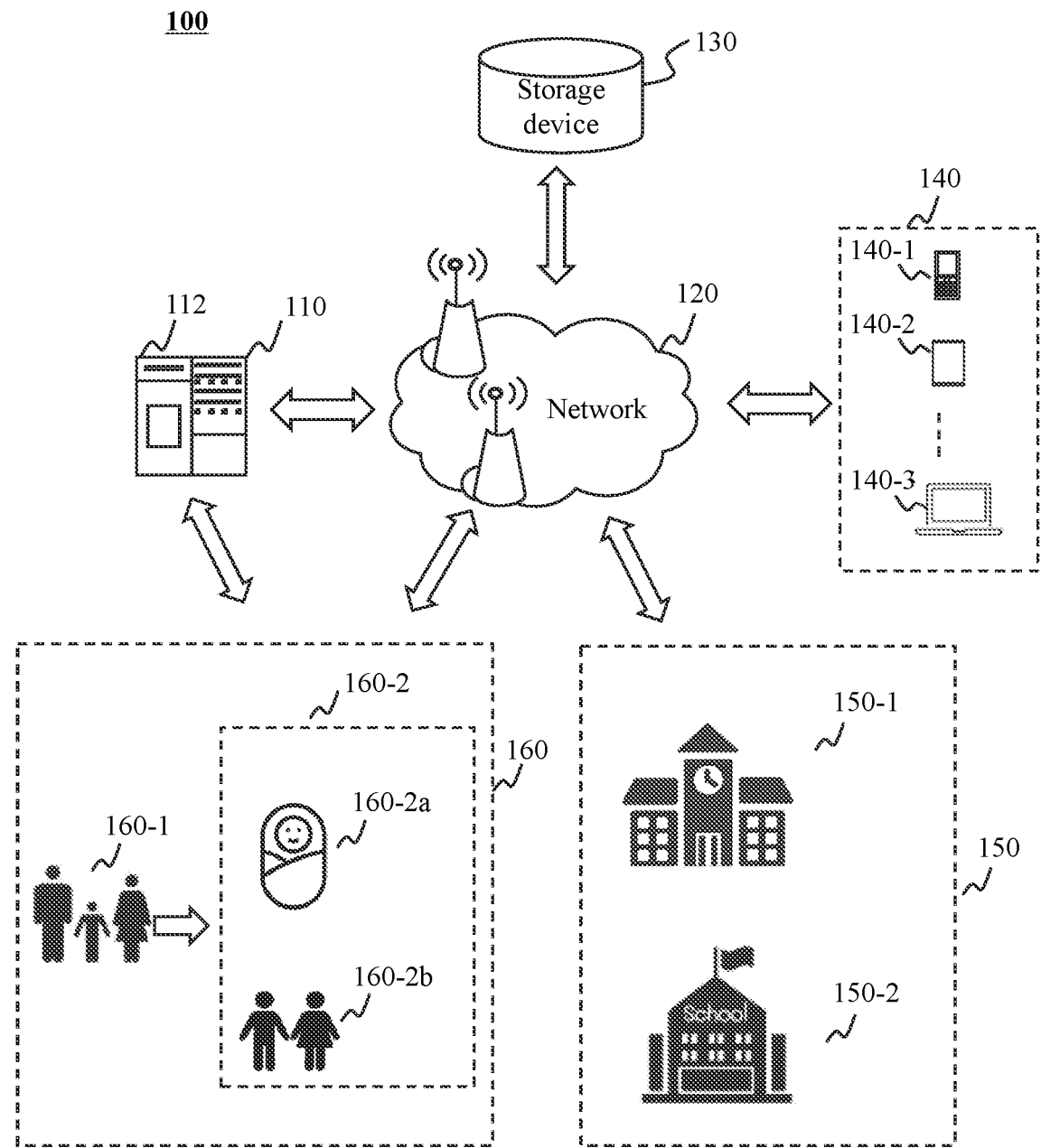
FIG. 1 is a schematic application scenario illustrating a method for regional population management in smart cities based on the Internet of Things (IoT) according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order.

However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be not implemented in order. Conversely, the operations may be implemented in an inverted order, or simultaneously. Moreover, one or more other operations may be added to the flowcharts. One or more operations may be removed from the flowcharts.

FIG. 1 is a schematic application scenario illustrating a method for regional population management in smart cities based on the Internet of Things (IoT) according to some embodiments of the present disclosure.

The application scenario 100 may include a server 110, a network 120, a database 130, a terminal device 140, and children's management institutions 150. The server 110 may include a processing device 112.

In some embodiments, the application scenario 100 of the system for regional population management may determine the construction plan of children's management institutions through the methods and/or processes disclosed in the present disclosure. For example, in a typical application scenario, when the construction plan of children's management institutions is required based on population data, it may obtain the population-related data in a historical target time period through an object platform, predict a number of children population in a future target time period based on the population-related data, determine a construction plan of children's management institutions 150 based on the number of children population, and feedback the construction plan to an user through a user platform based on a service platform.

The server 110 is connected to the terminal device 140, and the server 110 may be connected to the database 130 through the network 120. The server 110 may be used to manage resources and process data and/or information from at least one component or external data source (e.g., a cloud data center) of the system. In some embodiments, the construction plan of the children's management institutions 150 may be determined after server 110 processing. When processing, the server 110 may obtain the data from the database 130 or save the data to the database 130. In some embodiments, the server 110 may be a single server or a server group. In some embodiments, the server 110 may be regional or remote. In some embodiments, the server 110 may be implemented on the cloud platform or provided in a virtual way.

In some embodiments, the server 110 may include a processing device 112. The processing device 112 may process the data and/or information obtained from other devices or system components. The processor may execute the program instructions based on these data, information, and/or processing results to execute one or more functions described in the present disclosure. In some embodiments, the processing device 112 may include one or more sub-processing device (e.g., a single-core processing device or a multi-core processing device). As an example, the processing device 112 may include a central processing unit (CPU), an application-specific integrated circuit (ASIC), or the like, or any combination thereof.

The network 120 may connect the components of the application scenario 100 and/or the connection system and the external resource part. The network 120 allows communication between the components and other parts outside the system to promote the exchange of data and/or information. In some embodiments, the network 120 may be any or more of a wired network or a wireless network. For example, the network 120 may include cable networks, fiber networks, or the like, or any combination thereof. The network connection between each part may be used in one of the above ways or multiple ways. In some embodiments, the network may be a combination of various topological structures such as point-to-point, shared, and central types. In some embodiments, the network 120 may include one or more network access points. In some embodiments, data related to the population in the historical target time period 160-1 and data related to the children population in the future target time period 160-2 may be communicated via the network 120.

The population may be divided into groups with different people according to the place of residence, age, gender, occupation, and department. For example, the population may be divided into urban population and rural population according to the place of residence. For another example, the population may be divided into children population, juvenile population, youth population, middle-aged population, and elderly population according to age. In some embodiments, the population 160 may include the population in the historical target time period 160-1. The data of the population in the historical target time period 160-1 may include population economic growth data, population per capita income data, population age distribution data, population single child data, population education resource data, population employment opportunity data, population living cost data, etc. In some embodiments, the population 160 may also include the children population in the future target time period 160-2. In some embodiments, the management platform may predict the number of children population in the future target time period 160-2 based on the related data of the population 160-1.

The children population in the future target time period 160-2 may include the infant population of the target area in the first future time period 160-2a and the school-age children population of the target area in the second future time period 160-2b. The infants refer to children who are younger than 3 years old, and the school-age children refer to children who are older than 3 years old. For example, infants may be children aged 1-2, and school-age children may be children aged 5-10. In some embodiments, the server 110 and/or the terminal device 140 may obtain data related to the population in the historical target time period 160-1 through the network 120 or the database 130.

The database 130 may be used to store data and/or instructions. The database 130 may be directly connected to the server 110 or in the interior of server 110. In some embodiments, the database 130 may be used to provide the data related to the population in the historical target time period 160-1 for the regional population management application scenario 100. The database 130 may be implemented in a single central server, multiple servers, or multiple individual devices connected through a communication link.

In some embodiments, the server 110, the terminal device 140, and other possible system components may include the database 130.

The terminal device 140 refers to one or more terminal devices or software. In some application scenarios, users who use the terminal device 140 may refer to the direct or indirect service objects of the regional population management application scenario 100, which may include ordinary residents, government institutions, or other related personnel. For example, ordinary residents may include natural persons, corporate legal persons, etc. For another example, government institutions may include civil affairs institutions and civil affairs staff.

In some embodiments, the terminal device 140 may be used as the user platform. For example, when the users of the terminal device are ordinary residents, corresponding population data may be input using the terminal device 140 as the user platform. In some embodiments, the terminal device 140 may be used as the management platform. For example, when the users of the terminal device are government institutions, the terminal device 140 may be used as the management platform to aggregate relevant data for planning. In some embodiments, users of terminal device 140 may be one or more users. In some embodiments, the terminal device 140 may be one or any combination of other devices having input and/or output functions, such as the mobile device 140-1, the tablet computer 140-2, the knee-type computer 140-3, etc. In some embodiments, the terminal device 140 and other possible system components may include the processing device 112.

Children's management institutions 150 are institutions related to children's life and education. Children's management institutions 150 may include infants' management institutions 150-1 and schools 150-2. Infants' management institutions 150-1 refer to institutions that may specialize in infant's lives. For example, infants' management institutions 150-1 may be a nursery, etc. Schools 150-2 refers to institutions that conduct basic education for children in the education system. For example, schools 150-2 may be kindergartens. In some embodiments, the server 110 may determine the related data of the construction plan of the children's management institutions 150 based on the number of children population 160-2. In some embodiments, the construction plan may be fed back to the terminal device 140 through the network 120. In some embodiments, the related data of the construction plan of the children's management institutions 150 may be transmitted through the network 120.

It should be noted that the application scenario 100 is only provided for the purpose of explanation and not intend to limit the scope of the present disclosure. For ordinary technical personnel in the art, those skilled in the art or changes can be made according to the description of the present disclosure. For example, application scenario 100 may also include a storage device. For another example, application scenario 100 may implement similar or different functions on other devices. However, these changes and modifications may not deviate from the scope of the present disclosure.

The Internet of Things (IoT) system is an information processing system that includes some or all of a user platform, a service platform, a management platform, a sensor network platform. The user platform is the leader of the entire IoT operation system, which may be used to obtain user needs. User needs are the foundation and premise of the formation of the IoT operation system. The connections between the platforms of the IoT system are to meet the needs of users. The service platform is a bridge between the user platform and the management platform to realize the user platform and the management platform. The service platform provides users with input and output services. The management platform achieves connection and collaboration between various functional platforms (such as the user platform, the service platform, the sensor network platform, and the object platform). The management platform converges the information of the IoT operation system, which may provide perception management and control management functions for the IoT operation system. The sensor network platform realizes the function of connecting the management platform and the object platform, which plays the functions of sensing information sensor communication and control information sensor communication. The object platform is a functional platform for the generation of sensor information and the execution of control information.

The processing of information in the IoT system may be divided into a processing process of sensor information and a processing process of control information. Control information may be information generated based on sensor information. The processing of sensor information includes: obtaining the sensor information by the object platform, which are transmitted to the management platform through the sensor network platform, transmitting the calculated sensor information to the service platform and finally transmitting to the user platform by the management platform, generating control information after judging and analyzing the perception information by the user. The control information is generated by the user platform and issued to the service platform. The service platform transmits the control information to the management platform. The management platform calculates the control information and sends it to the object platform through the sensor network platform to achieve the control of the corresponding object.

In some embodiments, when applying the IoT system to city management, it may be called the IoT system in smart cities.

Figure 2:
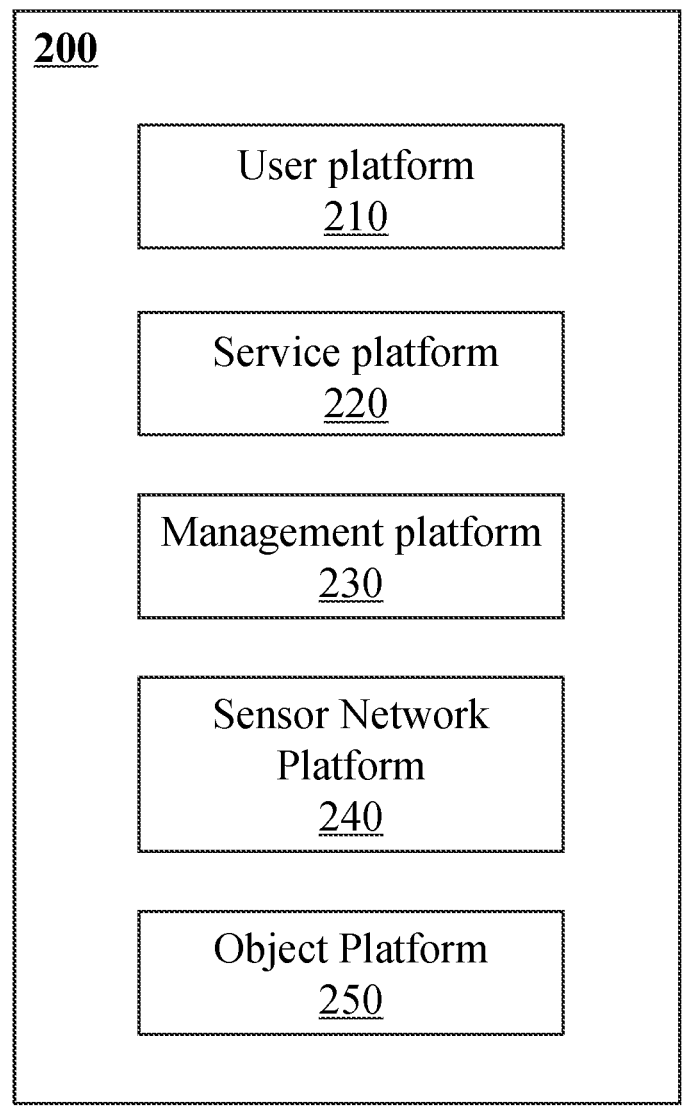
FIG. 2 is a block diagram illustrating a system for regional population management in smart cities based on the Internet of Things (IoT) according to some embodiments of the present disclosure.

As shown in FIG. 2, the system 200 for regional population management in smart cities based on the IoT includes a user platform, a service platform, a management platform, a sensor network platform, and an object platform. In some embodiments, the system 200 for regional population management in smart cities based on the IoT may be part of or implemented by server 110.

In some embodiments, the system 200 for regional population management in smart cities based on the IoT may be applied to a plurality of scenarios of population management. In some embodiments, the system 200 for regional population management in smart cities based on the IoT may respectively obtain a plurality of population data to obtain the population management strategy in the corresponding region. Population data may include newborn population data, aging population data, transferred population data, death population data, etc. In some embodiments, the population data and population management strategies in a plurality of regions may be obtained based on the system 200 for regional population management in smart cities based on the IoT, then the population data and population management strategies in the entire area (such as the entire city) may be obtained, and the planning of subsequent service facilities corresponding to a plurality of scenes of population management may be determined.

A plurality of scenes of population management may include such as city population estimation management scenarios, housing security management scenarios based on population management, medical facility construction management scenarios based on population management, and pension facility security management scenarios based on population management. It should be noted that the above scenarios are only an example, which do not restrict the specific application scenarios of the system 200 for regional population management in smart cities based on the IoT. The technical persons in the art may apply the system 200 for regional population management in smart cities based on the IoT to any other appropriate scenarios based on the content of the implementation of the embodiment.

In some embodiments, the system 200 for regional population management in smart cities based on the IoT may be applied to city population prediction. When applied to city population prediction, the object platform may be used to collect corresponding user information, such as family composition, member age, gender, physical health, marriage status, education, and other information. The sensor network platform may summarize the information of each user to the management platform, and the received information may be analyzed and processed by the management platform. For example, the change data of the family population is predicted according to member age, gender, marriage status, and other information and then the population change data of the entire region is obtained through combining the data of each family in the region to further predict the population data of the entire region. The management platform may send the corresponding prediction data and the population management strategy or plan determined based on the predicted data to the user platform through the service platform to feedback to the user.

In some embodiments, the system 200 for regional population management in smart cities based on the IoT may achieve housing security management planning based on population prediction data. For example, future housing demand is determined based on the resident population and the population growth rate, and then future housing construction is planned based on housing demand. Specifically, based on population growth data, existing affordable housing data, etc., the housing demand for a period of time in the future may be determined, and compared with the existing housing volume to obtain the demand difference, and then the corresponding construction plan may be derived.

In some embodiments, the system 200 for regional population management in smart cities based on the IoT may be applied to medical facility construction management scenarios. The object platform may be used to collect population data and existing medical supporting settings data, such as the distance between the hospital and the family, the type of the hospital (such as a women's and children's hospital, a specialized hospital, a general hospital, etc.), and the user's functional demand for the hospital. Based on the sensor network platform, the data collected by the object platform is summarized to the service platform, the collected data is analyzed, and the future population data, medical needs, and the update of medical resources in the region are predicted. The regional medical resource allocation plan for a future time period is obtained based on the predicted data, such as location of hospital, setting of hospital type, plan of hospital scale, etc., and then the medical resource allocation plan is sent to the user platform based on the service platform for feedback to users.

In some embodiments, the system 200 for regional population management in smart cities based on the IoT may be applied to pension facility security management scenarios based on population management. When applying for pension facility security management scenarios based on population management, the object platform may be used to collect information about existing pension facilities (such as nursing homes, etc.), information about the aging population in the regional family, and the age information of the family population. The information of the pension facilities may include the existing information of the elderly in the nursing home, the information of the existing supporting facilities, the information of the urgent facilities, and the information of existing staff. The sensor network platform may summarize the information collected by the object platform to the management platform, and the received information may be analyzed and processed by the management platform. For example, the future demand of pension facilities is predicted based on the information of the elderly population, the number of people that may be accommodated in the future, device update needs, service personnel recruitment, and training plans, etc. are predicted based on the existing information of the pension facilities, and then the prediction information and plans are sent to the user platform based on the service platform for feedback to users.

The following will illustrate specific descriptions of the system 200 for regional population management in smart cities based on the IoT through taking the system 200 for regional population management in smart cities based on the IoT applied to the regional children population data management scenario as an example.

The user platform 210 may be the user-oriented service interface. In some embodiments, the user platform 210 may receive the construction plan information sent by the system 200 for regional population management in smart cities based on the IoT. In some embodiments, the user platform 210 may be configured to feedback the construction plan to the user based on the service platform 220.

The users may refer to the direct or indirect service objects of the system 200 for regional population management in smart cities based on the IoT. For example, users may include natural persons, corporate legal persons, non-corporate legal persons, civil affairs staff, etc. In some embodiments, the number of users may be one or more.

The service platform 220 may be the platform for preliminary processing of population data. In some embodiments, the service platform 220 may be connected with the user platform 210 and the management platform 230 to obtain relevant data and perform data processing. For example, the service platform 220 may receive information from the management platform 230 and perform data processing such as extraction, classification, and reprocessing on the received information to generate valuable information such as statistical data, trend data, and comparative data, and provide corresponding services for users according to users' needs.

The management platform 230 may refer to the IoT platform that plans and coordinates the connection and collaboration between functional platforms for providing perception management and control management.

In some embodiments, the management platform 230 is configured to obtain the population-related data in the historical target time period through the object platform based on the sensor network platform, predict the number of children population in the future target time period based on the population-related data, determine the construction plan of children's management institutions based on the number of children population, which includes the number of institutions, and feed back the construction plan to the user through the user platform based on the service platform.

In some embodiments, the management platform 230 is further configured to predict the number of children population of the target area in the first future time period based on the population-related data of the target area in the historical target time period.

In some embodiments, the management platform 230 is further configured to adjust the number of infant population based on family conditions of residents, determine the number of infant population be managed based on the adjusted number of infant population, and determine the construction plan of infant's management institutions based on the number of infant population be managed.

In some embodiments, the management platform 230 is further configured to predict the number of school-age children population of the target area in the second future time period based on the population-related data and determine the school construction plan in the target area based on the number of school-age children population of the target area in the second future time period.

For more details about the management platform 230, please refer to FIGS. 3-7 and the related descriptions.

The sensor network platform 240 may be the platform for realizing the interaction between the management platform and the object platform. In some embodiments, the sensor network platform 240 may preprocess information obtained from the object platform. For example, the preprocessing includes adjusting the population-related data obtained from the object platform into a format read by the management platform, deleting invalid content obtained from the object platform's population-related data, pre-analyzing the population-related data obtained from the object platform, etc.

The object platform 250 may be the functional platform for generating perception information and final executing control information. The object platform 250 may be used to receive user needs data and upload user needs data to the management platform through the sensor network platform. For another example, the object platform 250 may also be used to receive management plans for user needs sent by the management platform based on the sensor network platform and feedback the management plan to users through the service platform. In some embodiments, the object platform 250 may be the remote platform controlled by managers, artificial intelligence, or preset rules.

In some embodiments, the object platform 250 may be used to obtain demand data from the social IoT. The social IoT may refer to the IoT system that collects and process social information. The object platforms in the system for regional population management in smart cities based on the IoT in the embodiment may communicate with the corresponding platforms in the social IoT and the object platform in the system for regional population management in smart cities based on the IoT obtains the required information from the corresponding platform in the social IoT. For example, the object platform 250 in the system for regional population management in smart cities based on the IoT may communicate with the user platform of the social IoT for population data collection and management. The user platform based on the social IoT collects at least one of marriage data, pregnant women file data, and registration data of birth population.

For those skilled in the art, after understanding the principles of the system, it is possible to apply the system 200 to any other appropriate scenarios without departing from this principle.

It should be noted that the above description of the system and its components is only for the convenience of description, and it may not limit the scope of the implementation of the present disclosure to the scope of the embodiments. Understandably, for the technical persons in the art, after understanding the principle of the system, it is possible to arbitrarily combine various components or form a subsystem to connect with other components without departing from this principle. For example, each component may share a storage device, and each component may also have its own storage device. Such variations are within the protection range of the present disclosure.

Figure 3:
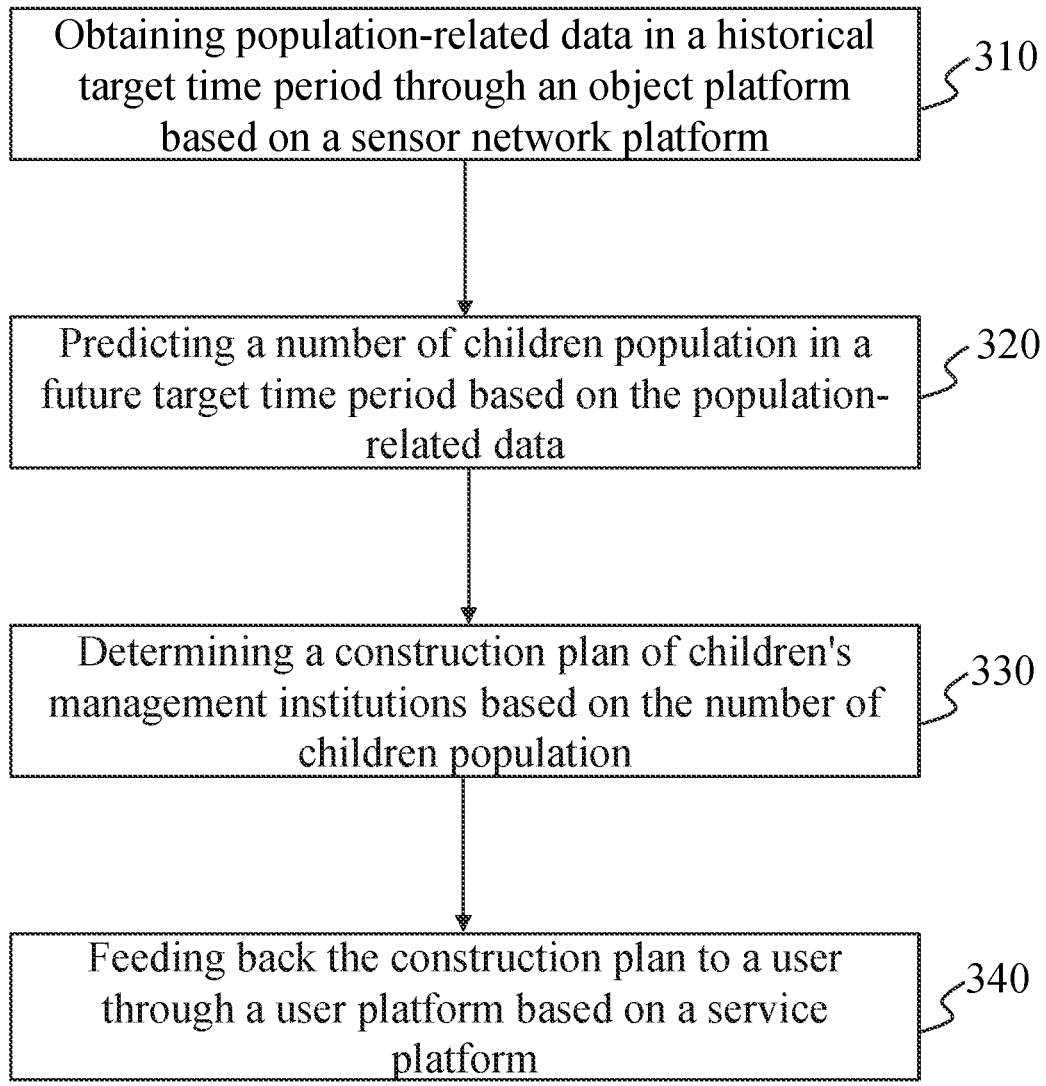
FIG. 3 is a flowchart illustrating an exemplary process of a method for regional population management in smart cities based on the Internet of Things (IoT) according to some embodiments of the present disclosure.

FIG. 3 is a flowchart illustrating an exemplary process of a method for regional population management in smart cities based on the Internet of Things (IoT) according to some embodiments of the present disclosure. As shown in FIG. 3, the process 300 includes the following steps. In some embodiments, the process 300 may be performed by the management platform 230.

Step 310, obtaining the population-related data in the historical target time period through the object platform based on the sensor network platform.

The historical target time period may be a free time period before obtaining population-related data. For example, the historical target time period may be two months, 1 year, 3 years, etc. before obtaining the population-related data.

The population-related data may be any data related to population statistics and life development in a certain region. For example, the population-related data may include the total population, population age composition data, population economic income data, population location distribution data, etc.

In some embodiments, the population-related data may be data related to children population prediction within a certain region. For example, the population-related data may include at least one type of marriage data, pregnant women file data, and registration data of birth population.

Marriage data may be data related to the marital status of the population in a certain region during a certain period of time in history. For example, marriage data may include the number of newly added marriages and the number of newly added divorces in a certain region during a certain period of time in history.

Pregnant women file data may be data related to the number of pregnant women in a certain region during a certain period of time in history. For example, the pregnant women file data may include the number of newly filed pregnant women and the number of newly miscarriages in a certain region during a certain period of time in history.

The registration data of birth population may be data related to the birth of the newborn in a certain region during a certain period of time in history. For example, the birth population registration data may include the number of newborns in a certain region during a certain period of time in history.

In some embodiments, the population-related data also includes at least one of the infant data in the nursery and the infant vaccination data.

The infant data in the nursery may be the data that reflect the situation of infants in the nursery in a certain region during a certain period of time in history. For example, the infant data in the nursery may be the number of infants, the age of the infants, the name of the infants, the gender of the infants, etc. in a certain region during a certain period of time in history.

The infant vaccination data may be the data that reflects the vaccination status of infant in a certain region during a certain period of time in history. For example, the infant vaccination data may include the number of vaccinations such as hepatitis B vaccine, *Bacillus* Calmette Guerin (BCG) vaccine, poliovirus vaccines, sugar pills, etc. in a certain region during a certain period of time in history.

In some embodiments, the population-related data may be entered and obtained through terminal device on the user platform by relevant personnel of local hospitals, demographic departments, civil affairs departments and other institutions or by residents who are counted. In some embodiments, the population-related data may be obtained by the storage device and network to obtain historical population-related data and obtain population-related data in a historical target time period through uploading collected data to the service platform by the user platform.

Step 320, predicting the number of children population in the future target time period based on the population-related data.

The future target time period may be a free time period after obtaining population-related data. For example, the future target time period may be a time period after the deadline for obtaining population-related data or a time period after the current time, such as 2 months, 1 year, 3 years, etc.

In some embodiments, children may refer to the population under the age of 18. Children may include infant and school-age children, infant may be children under 3 years old, and school-age children may be children over 3 years old. The number of children population may be the total number of children population in a certain region during a certain period of time in history.

In some embodiments, the management platform may realize predicting the number of children population in the future target time period based on the population-related data in a plurality of ways. For example, the number of children population in future target time period may be predicted based on the mapping relationship between population-related data and the number of children population in future target time period. For example, the total population in a certain region during a certain period of time in history may include a certain proportion of children population (such as 10%) and the number of children population in the future target time period may be obtained based on the product of the total population in the population-related data and the ratio.

In some embodiments, the number of children population may be predicted based on a machine learning model.

Figure 4:
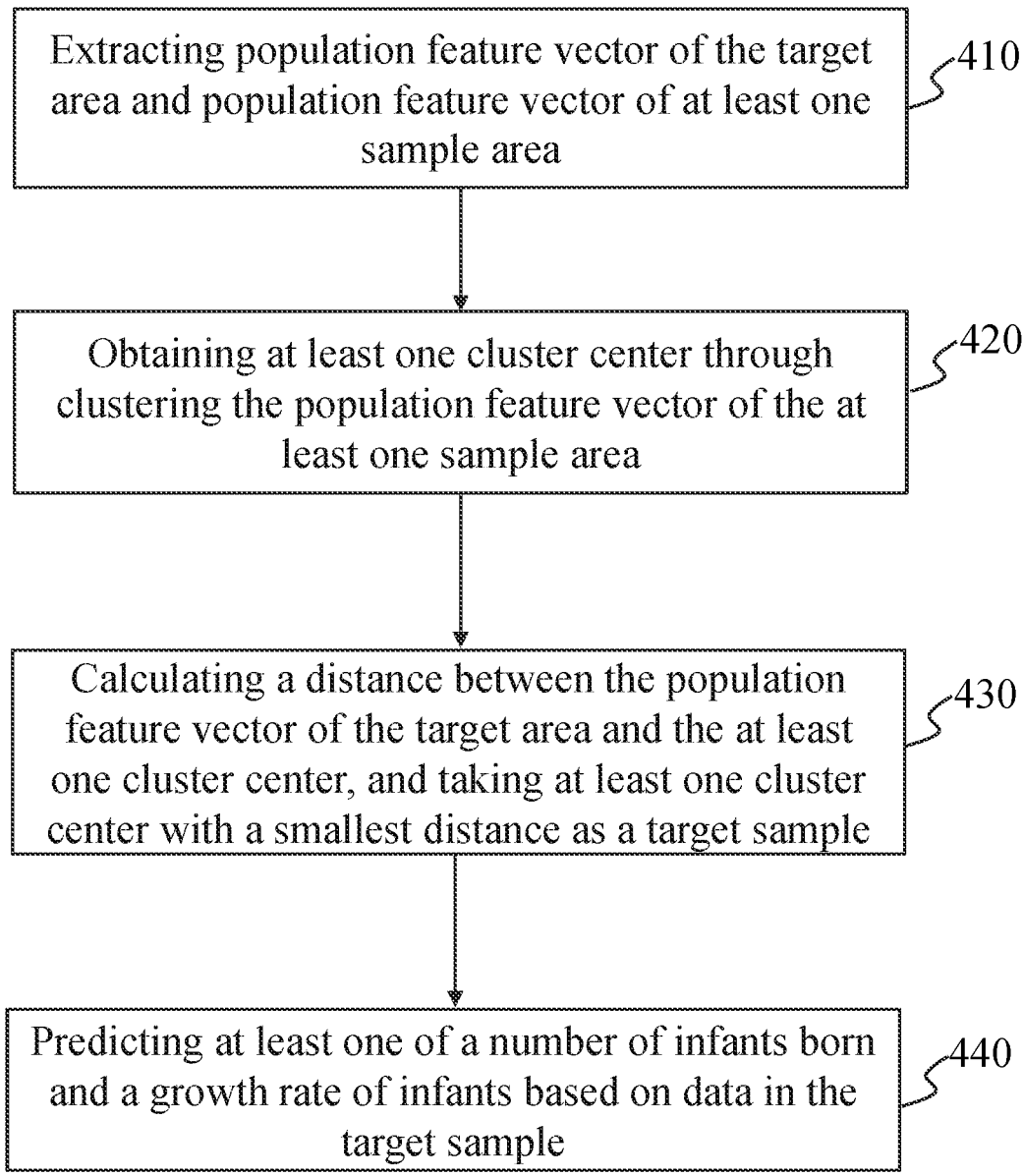
FIG. 4 is a flowchart illustrating an exemplary process for predicting a number of children population according to some embodiments of the present disclosure.

For more details about the number of children population in the future target time period, please refer to FIG. 4 and the related descriptions.

Step 330, determining the construction plan of children's management institutions based on the number of children population, the construction plan including the number of institutions.

Children's management institutions may be institutions related to children's life and education. For example, children's management institutions may include confinement centers, nurseries, kindergartens, schools, etc. In some embodiments, children of different ages may be assigned to different children's management institutions, such as children under 3 years old may be assigned to confinement centers and nurseries, children over 3 years old may be assigned to kindergartens, schools, etc. In some embodiments, the number of children's management institutions in a certain region may reflect tolerance of the region for unified management of children. For example, a higher number of institutions reflects that the region may accommodate more children for unified management.

The construction plan may be the planning of children's management institutions. For example, the construction plan may include the number of institutions to be built, the location of the institutions, the construction time of the institutions, the completion time of the institutions, the capacity of the institutions, etc.

In some embodiments, the construction plan of children's management institutions may be determined based on the children population. For example, the number and capacity of children's management institutions are determined based on the number of the children population, the distribution of children's management institutions is determined based on the distribution of the children population, and the construction time and completion time are determined based on the demand time of the children population for the use of the structure, etc.

Step 340, feeding back the construction plan to the user through the user platform based on the service platform.

In some embodiments, the service platform may feedback the construction plan to the user through the user platform in any form such as text, image, voice, etc.

Through the regional population management method described by some embodiments of the present disclosure, it may realize the precise planning for the number of children population and population distribution, so that children's management institutions meet the local children population situation, which avoids wasting educational resources while ensuring that children are properly managed.

It should be noted that the description of the above-mentioned process 300 is only for examples and descriptions, but not limited to the scope of the application of the present disclosure. For technicians in the art, under the guidance of the present disclosure, various amendments and changes may be made to the process 300. However, these amendments and changes are still within the scope of the present disclosure. For example, the process 300 may also include post-processing steps.

FIG. 4 is a flowchart illustrating an exemplary process for predicting a number of children population according to some embodiments of the present disclosure.

In some embodiments, the management platform 230 may predict the number of infant population of the target area in the first future time period based on the population-related data of the target area in the historical target time period.

The target area may be the geographical area that requires regional population management. For example, the target area may be a certain city such as Beijing, and a certain area of the city, such as Haidian District of Beijing.

The first future time period may be the time period used to predict the number of infant population. For example, the first future time period may be 2 months, 1 year, 2 years, etc. after the obtaining of population-related data. In some embodiments, the first future time period may be the same time corresponding to the future target time period such as 3 years after the obtaining of population-related data. In some embodiments, the first future time period may be the time included in the future target time period. For example, the future target time period corresponds to 3 years after the obtaining of the population-related data, and the first future time period is 1 year after the obtaining of the population-related data.

The number of infant population may be the number of children under 3 years old in a certain region during a certain period of time in history.

In some embodiments, the number of infant population in the first future time period may be predicted by the management platform 230 after processing the population-related data of the target area in the historical target time period. The specific process is shown in FIG. 4, and the process 400 includes the following steps. In some embodiments, the process 400 may be performed by the management platform 230.

Step 410, extracting population feature vectors of the target area and a plurality of sample areas.

The sample area may be a geographical area with a number of population, a population distribution, and a age composition similar to that of the target area. In some embodiments, the sample area may be one or more adjacent to the target area. For example, when the target area is Haidian District of Beijing, the sample area may be Fengtai District of Beijing, etc.

The population feature vector may be a vector that can reflect the population change features. For example, elements of the population feature vector may include data such as the growth number and proportion of infants born, the growth number and proportion of immigrant children, the growth number and proportion of school-age children born, and the growth number and proportion of immigrant school-age children.

In some embodiments, the population feature vector may be obtained through performing feature extraction on the population-related data of the corresponding area in the historical target time period based on the management platform. For example, the population feature vector of the sample area may be obtained by performing feature extraction on the population-related data of the sample area in the historical target time period. In the same way, the population feature vector of the target area may be obtained by performing feature extraction on the population-related data of the target area in the historical target time period.

In some embodiments, the management platform may extract population feature vectors in a plurality of ways. For example, the management platform may perform feature extraction from the population-related data of the obtained area in the historical target time period through methods such as a machine learning model and manual extraction, and then obtain the population feature vector of the area.

Step 420, obtaining a plurality of cluster centers through clustering the population feature vectors of a plurality of sample areas.

In some embodiments, the process of clustering the population feature vectors of a plurality of sample areas may be the process of determining a correlation degree between the population feature vectors. That is, the population feature vectors with a high correlation degree (the growth number and proportion of infants born are similar, etc.) are clustered in a cluster, and each cluster includes a cluster center as a sample reflecting the common features of the cluster and other samples with highly correlated cluster center. In some embodiments, the clustering process may be based on cluster algorithms. For example, cluster algorithms may include K-means algorithms, density clustering, hierarchical clustering, Gaussian mixture clustering, etc.

Step 430, calculating distances between the population feature vector of the target area and each cluster center and taking a cluster center with a minimum distance as a target sample.

In some embodiments, the distance between the population feature vector of the target area and each cluster center may be determined by calculating the vector distance (e.g., Euclidean distance). For example, the distance from the N-dimensional population feature vector to a cluster center may be calculated as follows:

$$D = \sqrt{\sum_{i=1}^{n}(x_i - y_i)}$$

where D is the distance between the population feature vector and a certain cluster center, i is the space dimension, and x and y are the different population features of the population feature vector.

In some embodiments, the management platform may use the cluster center with the smallest vector distance as the target sample corresponding to the population feature vector of the target area. For example, the cluster center K with the smallest distance of Euclidean distance D is taken as the target sample corresponding to the population feature vector of the target area.

Step 440, predicting at least one of the number of infants born and the growth rate of infants based on the data in the target sample.

The number of infant and the growth rate of infants may be the parameters that reflects the changes in the number of infants.

In some embodiments, the prediction process may be to average the corresponding parameters (such as the growth number of the infants, and growth rate of the infant) of all samples in the cluster corresponding to the target sample (the cluster center) and use the average as the predicted data (such as the number of the infants, the growth rate of the infants). For example, the average of the number of the infants born in a plurality of samples in the cluster corresponding to the cluster center K is calculated and the average is used as the prediction result of the number of infants in the target area. For another example, the average of the growth rate in a plurality of samples in the cluster corresponding to the cluster center K is calculated, and the average is used as the prediction result of the number of births in the target area, etc.

It should be noted that the description of the above-mentioned process 400 is only for examples and descriptions, but not limited to the scope of the application of the present disclosure. For technicians in the art, under the guidance of the present disclosure, various amendments and changes may be made to the process 400. However, these amendments and changes are still within the scope of the present disclosure. For example, process 400 may also include pre-processing steps.

Figure 5:
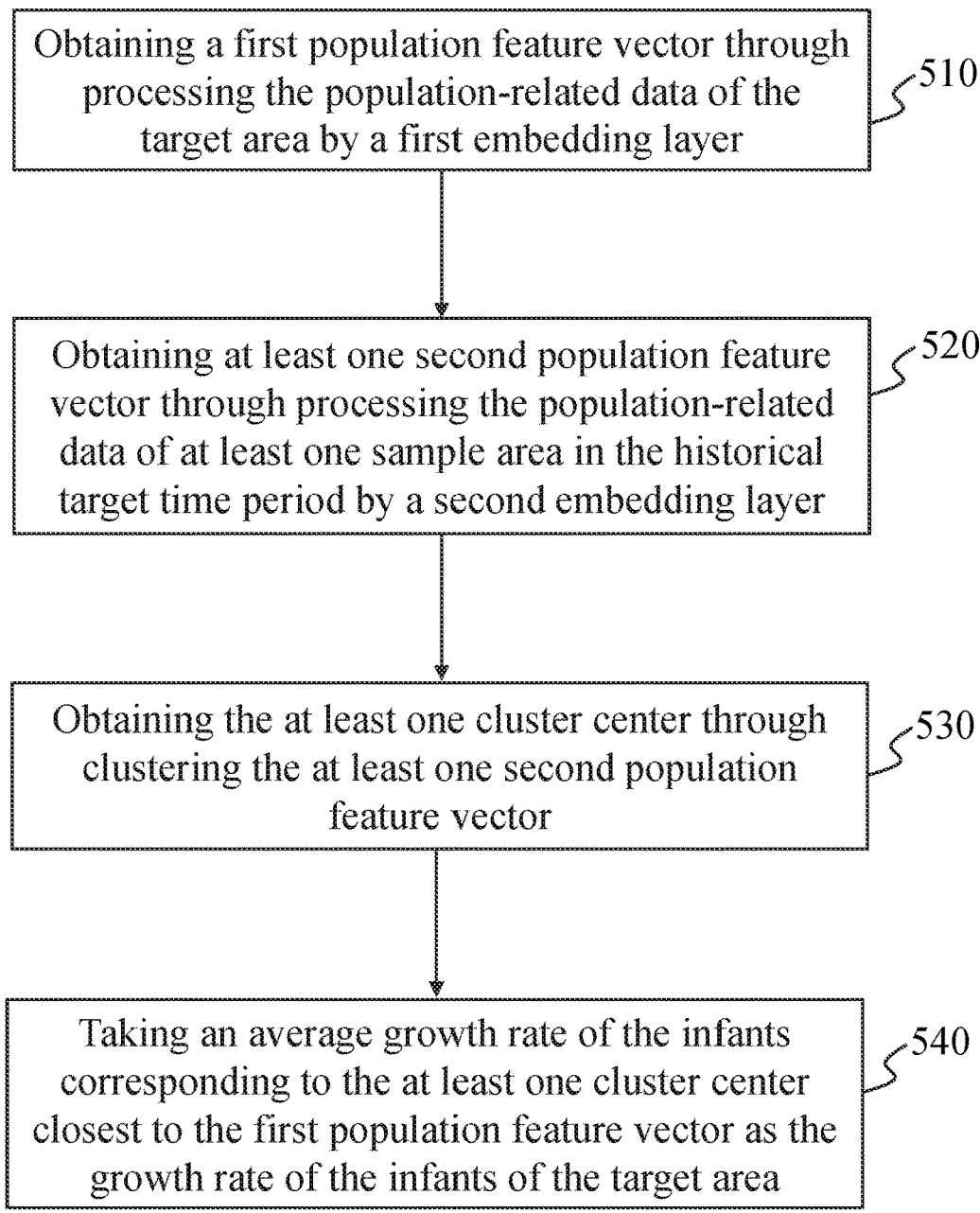
FIG. 5 is a flowchart illustrating an exemplary process for predicting a growth rate of infants in a target area according to some embodiments of the present disclosure.

FIG. 5 is a flowchart illustrating an exemplary process for predicting a growth rate of infants in a target area according to some embodiments of the present disclosure. As shown in FIG. 5, the process 500 includes the following steps. In some embodiments, the process 500 may be executed by the management platform 230.

Step 510, obtaining a first population feature vector through processing the population-related data of the target area by a first embedding layer.

The embedding layer may be a model for extracting the population feature vector. For example, the embedding layer may be long and short-term neural network models.

In some embodiments, the input of the embedding layer may be the population-related data in the corresponding area. The output of the embedding layer may include the population feature vector in the area. For example, the input of the embedding layer is the population-related data in the target area, and the output of the embedding layer may include the first population feature vector corresponding to the target area.

The first population feature vector may be the vector corresponding to the population change feature of the target area. For example, the elements of the first population feature vector may include data such as the growth number and proportion of the infants born, the growth number and proportion of immigrant infants, the growth number and proportion of school-age children born, and the growth number and proportion of immigrant school-age children in the target area.

In some embodiments, the first population feature vector may be the vector composed of multi-dimensional elements. For example, the first population feature vector may be a 2-dimensional vector, that is (x, y)=(3000, 2500), where X is the feature value of the growth number of the infants in the target area, and Y is the feature value of the growth number of immigrant infants in the target area.

In some embodiments, the input of the embedding layer may also include basic development data in the corresponding area. Basic development data may be parameters related to the social development of the area. For example, basic development data may include parameters such as economic growth, per capita income, age distribution, single children, educational resources, employment opportunities, living costs, etc.

By adding basic development data to the input content of the embedding layer described in some embodiments of the present disclosure, the macroeconomic development data of a certain area may be added as a reference when predicting the number of children, realizing the comprehensive consideration of population-resources and improving prediction accuracy.

Step 520, obtaining at least one second population feature vector through processing the population-related data of at least one sample area in the historical target time period by a second embedding layer.

The second population feature vector may be the vector corresponding to the number of population changes in the sample area. For example, elements of the second population feature vector may include data such as the growth number and proportion of the infants born, the growth number and proportion of immigrant infants, the growth number and proportion of school-age children born, and the growth number and proportion of immigrant school-age children in the sample area.

In some embodiments, the second population feature vector may be the vector composed of multi-dimensional elements. For example, the second population feature vector may be a 2-dimensional vector, that is (x, y)=(3000, 2500), where X is the feature value of the growth number of the infants in the sample area, and Y is the feature value of the growth number of immigrant infants in the sample area.

Step 530, obtaining the at least one cluster center through clustering the at least one second population feature vector.

In some embodiments, the management platform may cluster a plurality of second population feature vectors through the clustering algorithm to determine a plurality of cluster centers. For example, the management platform may cluster according to the growth rate of infants and divide the second population feature vector into the population feature vector with the growth rate of infants exceeding 20% and the population feature vector with the growth rate of infants less than 20%. The population feature vectors with the growth rate of infants exceeding 20% are clustered to obtain the clustering center $k_1$, the population feature vectors with the growth rate of infants less than 20% are clustered to obtain the clustering center $k_2$. Therefore, the cluster center $k_1$ is the reference feature of the population feature vector whose growth rate of infant exceeds 20%, and the cluster center $k_2$ is the reference feature of the population feature vector whose growth rate of infant is less than 20%.

Step 540, taking an average growth rate of the infants corresponding to the at least one cluster center closest to the first population feature vector as the growth rate of the infants of the target area.

In some embodiments, the management platform may calculate the vector distances between the first population feature vector and each cluster center. That is, after comparing the population feature in the first population feature vector with the reference feature of each cluster center, the cluster center with the minimum vector distance (the population feature has the highest similarity with the reference feature) is determined, and the average growth rate of infant corresponding to the cluster center is taken as the growth rate of the infants of the target area.

For the specific descriptions of calculating vector distance, please refer to the step 430 and related descriptions thereof. For the specific descriptions of taking the average growth rate of the infants corresponding to the cluster center as the growth rate of the infants of the target area, please refer to the step 440 and related descriptions thereof.

In some embodiments, the management platform may also take the average growth number of infants corresponding to the cluster center closest to the first population feature vector as the growth number of infants in the target area or take the average/weighted average of other population features corresponding to the cluster center closest to the first population feature vector as the population feature of the target area.

Figure 8:
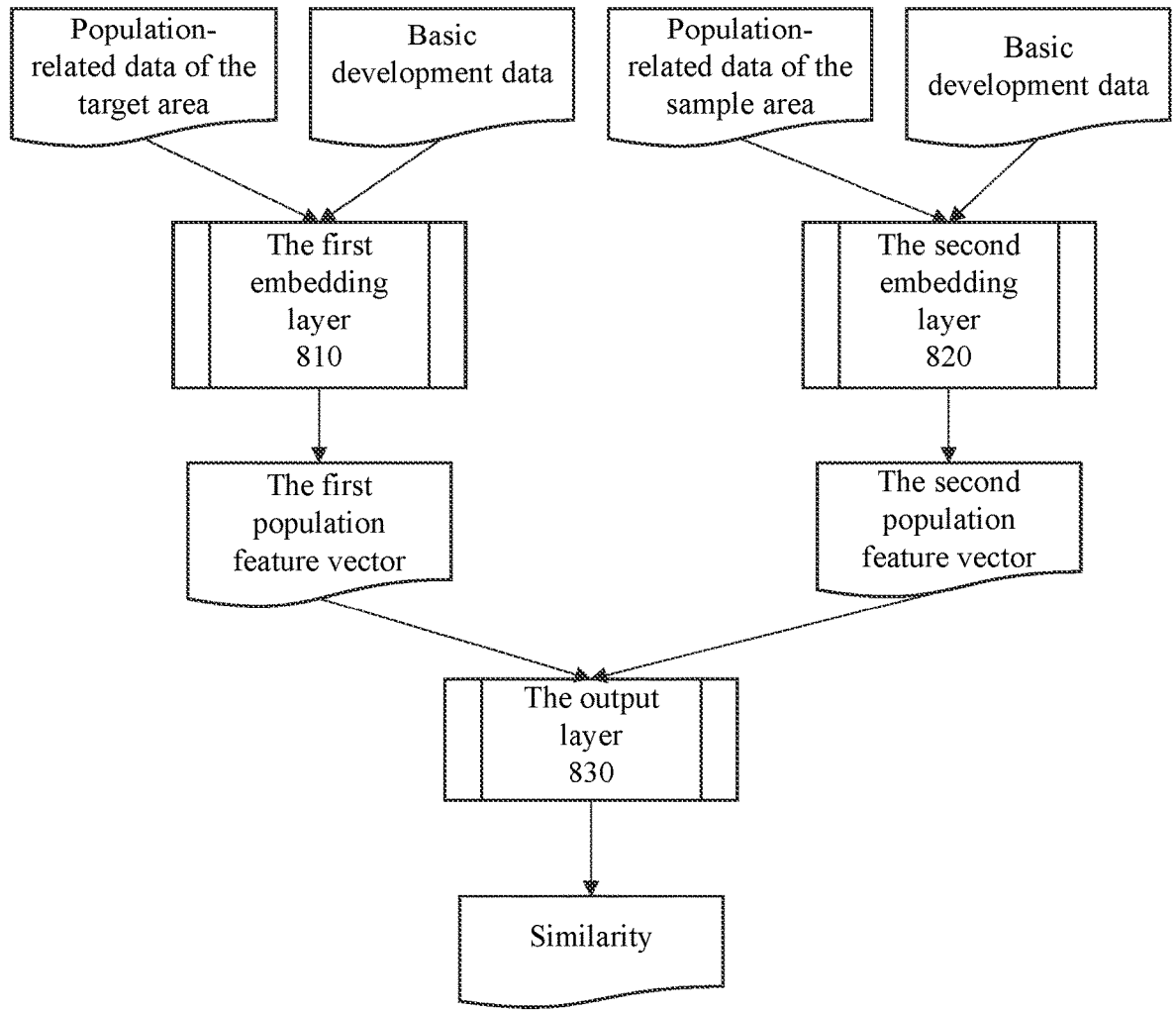
FIG. 8 is an exemplary structural diagram of a first model according to some embodiments of the present disclosure.

In some embodiments, the trained embedding layer may be obtained by training the customized first model. The structure of the first model 800 is shown in FIG. 8.

The first model may be the model including an embedding layer. In some embodiments, the first model may be a long short term memory network (LSTM) model, a Deep Neural Networks (DNN) model, or the like, or any combination. In some embodiments, the first model may include the first embedding layer 810, the second embedding layer 820, and the output layer 830. The first embedding layer is used to extract the first population feature vector reflecting the population features of the target area in the same historical time period. The second embedding layer is used to extract the second population feature vector reflecting the population features of a plurality of sample areas in the same historical time period. The output layer is used to obtain the similarity between various types of population growth in different sample areas.

The first embedding layer may be a model for extracting the first population feature vector reflecting the population features of the target area in the same historical time period. For example, the first embedding layer may be the LSTM model.

The second embedding layer may be a model for extracting the second population feature vector reflecting the population features of a plurality of sample areas in the same historical time period. For example, the second embedding layer may be the LSTM model. In some embodiments, a plurality of sample areas may correspond to a plurality of second embedding layers.

In some embodiments, the order of the first embedding layer and the second embedding layer is only for description, and it does not constitute a limit on the order of the embedding layer. In some embodiments, the functions of the first embedding layer and the second embedding layer may be replaced with each other.

The output layer may be a model for obtaining the similarity between the population growth of the target area and the sample area. In some embodiments, the output layer may be the DNN model.

In some embodiments, the input of the first model may include the population-related data and basic development data of at least two different areas. The output of the first model may include the similarity of the population growth in at least two different areas. Specifically, the output of the first model may include the similarity between the proportion of the growth number of infants born in the target area and the sample area, and the similarity between the proportion of the growth number of immigrant infant in the target area, and the sample area, etc.

In some embodiments, the input of the first embedding layer may include the population-related data in the target area and the basic development data of the target area. The output of the first embedding layer may include the first population feature vector of the target area.

In some embodiments, the input of the second embedding layer may include the population-related data in the sample area and the basic development data of the sample area. The output of the second embedding layer may include the second population feature vector of the sample area.

In some embodiments, the input of the output layer may include the output of the first embedding layer and the second embedding layer, such as the first population feature vector, and the second population feature vector. The output of the output layer may include the similarity between the population growth of the target area and the sample area.

In some embodiments, the first model may be obtained through joint training. Based on the trained first model, the first embedding layer or the second embedding layer may be used as the embedding layer in FIG. 5. For example, the training sample data is entered into the first embedding layer and the second embedding layer to obtain the output population feature vector, and the training sample data is the historical population-related data and historical basic development data in the corresponding area. Then the population feature vector is used as the training sample data of the output layer and is inputted into the output layer to obtain the similarity between population growth in different areas, and the output of the output layer is verified by using sample similarity. The verification data of the population feature vectors output by the first embedding layer and the second embedding layer is obtained by using the back-propagation features of the neural network model, and the first embedding layer and the second embedding layer are trained using the verification data of the population feature vector as the labels.

For another example, the training sample data includes the historical population-related data, historical basic development data, and sample population feature vector in some areas. The training sample data is input into the first embedding layer and the second embedding layer, the sample population feature vector is input into the output layer. The output of the first embedding layer and the second embedding layer are used as the input of the output layer. The label is similarity between population growth in different areas. During the training process, based on the similarity between population growth in different areas and the outputs of the first and second embedding layers, a loss function is established to update the parameters of the model.

In some embodiments, the training sample data may at least include data related to the population born of different sample areas in the same historical time period and the basic development data corresponding to the above areas. The label may be the similarity between the population growth of different sample areas. The label may be obtained manually or determined by calculating the Euclidean distance between the first population feature vector and the second population feature vector.

In some embodiments, the trained first embedding layer and the trained second embedding layer may be used as the above-embedding layer to extract the population feature vector. For example, the first embedding layer and the second embedding layer may be used as the embedding layer involved in FIG. 5.

Through the prediction process of growth rates of the infants in the target area described by some embodiments in the present disclosure, it can realize the intelligent prediction of growth rate of the infants based on deep learning and improve the authenticity and accuracy of the prediction results by using population-related data, and the social development status as a reference basis. In addition, during the model training, for the embedding layer that is difficult to obtain labels, the first model is introduced for training and similarity is tagged as a label to facilitate to obtain labels.

Figure 6:
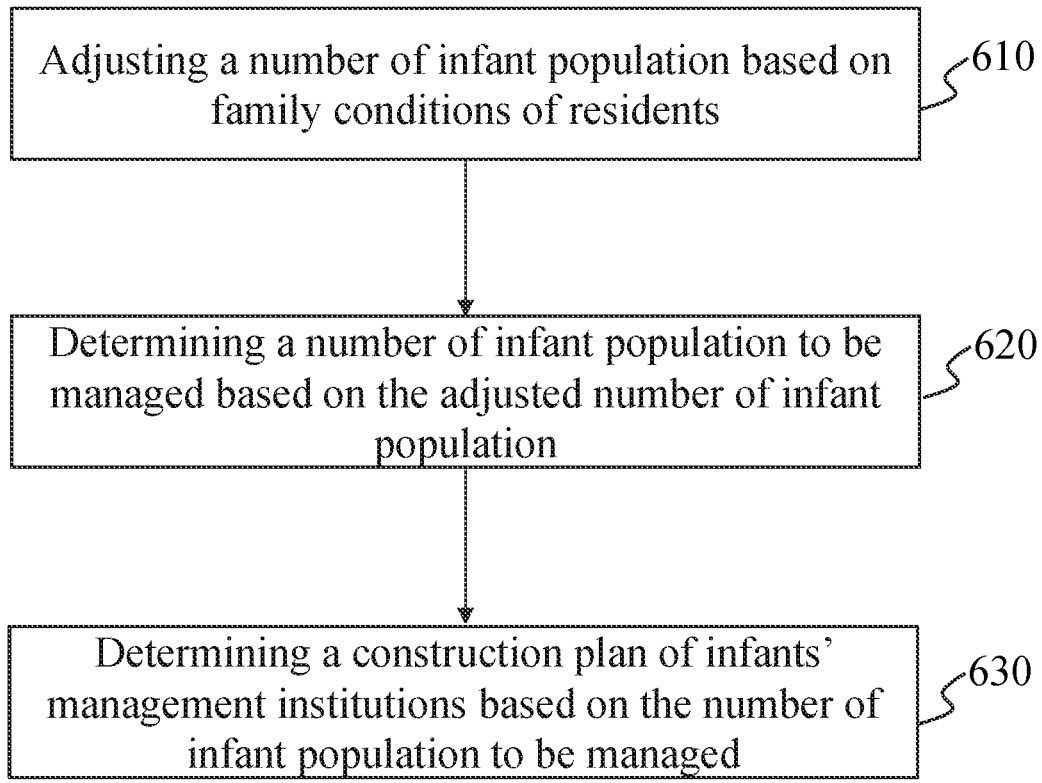
FIG. 6 is a flowchart illustrating an exemplary process for determining a construction plan of children's management institutions according to some embodiments of the present disclosure.

FIG. 6 is a flowchart illustrating an exemplary process for determining a construction plan of children's management institutions according to some embodiments of the present disclosure. As shown in FIG. 6, the process 600 includes the following steps. In some embodiments, process 600 may be executed by the management platform 230.

Step 610, adjusting the number of the infant population based on family conditions of residents.

Family conditions of residents may be composed, economy, development of residents' families, etc. For example, the family conditions of residents may include family members' composition, family members' age, family annual income, family members' occupation, education levels of family members, etc.

In some embodiments, adjustment of the number of infant population may be to amend the number of the infants who need to go to the infants' management institutions. For example, some infants in the target area may not be managed uniformly due to certain family conditions. For example, the residents' families have no economic conditions to send infants into the nurseries for management, or the residents' families may have a person to manage the children alone. At this time, the number of infant population needs to be corrected. In some embodiments, the adjustment process may be obtained by multiplying the number of infants and the enrollment rate of the infant population to obtain the actual number of infants in the nursery population in the infant population.

The enrollment rate may be the proportion of the infant population attending the nursery, such as 95%, 98%, etc. In some embodiments, the enrollment rate may be obtained based on the adjustment factor. For more details about obtaining the enrollment rate and calculating the true number of the infant population in the nurseries through the enrolment rate, please refer to related descriptions about the calculation of the infant population to be managed later.

In some embodiments, the management platform may determine the adjustment factors based on statistics of the residents' family conditions.

In some embodiments, the statistics of residents' family conditions may include statistics of various factors that may affect infant's acceptance of unified management. For example, the statistics of residents' family conditions may include the proportion of families in the target area with family income less than an income threshold to the total number of families in the target area, the proportion of families with elderly in the target area to the total number of families in the target area, and the proportion of the population receiving higher education in the target area to the total population, etc.

The adjustment factor is the parameter that reflects the proportion of infant who attend or do not nursery (enrollment). For example, the adjustment factor may be calculated as follows:

$$T = aM_1 + bM_2$$

where T is the adjustment factor, a is the proportion of families in the target area with family income less than the income threshold to the total number of families in the target area, $M_1$ and $M_2$ are the default values, b is the proportion of families with elderly in the target area to the total number of families in the target area. In some embodiments, the above default values may be determined by manual setting based on experience, such as 0.9 and 0.88, respectively. In some embodiments, the above equation may also include $cM_3$ and $dM_4$ . . . , c is the proportion of the population receiving higher education in the target area to the total population, d is . . . , $M_3$ and $M_4$ are the default values . . . .

Step 620, determining the number of infant population be managed based on the adjusted number of infant population.

The children population be managed may be the infant population in the target area who needs to attend a nursery (enrollment).

In some embodiments, the infant population be managed may be determined by the following calculations:

$$P = (1-T)Q$$

where P is the infant population to be managed, Q is the number of infant population, T is the adjustment factor, and 1−T is the enrollment rate.

In some embodiments, the infant population to be managed may be determined through a difference determination model. The difference determination model may be the neural network model, etc.

In some embodiments, the inputs of the difference determination model may include the statistics of the residents' family conditions, and the output of the difference determination model may include the difference between the actual infant population to be managed and the number of infants. By subtracting the difference between the number of infant and the actual infant population to be managed from the number of infants, the actual infant population to be managed may be obtained.

In some embodiments, the difference determination model may be trained through a plurality of label training samples. For example, a plurality of labeled training samples may be input into an initial difference determination model, a loss function is established by the results of the labels and the difference determination model, and parameters of the initial difference determination model are iteratively updated based on the loss function. When the loss function of the initial difference determination model satisfies the preset conditions, the model training is completed, and the trained difference determination model is obtained. The preset conditions may be the convergence of the loss function, the number of iterations to the threshold, etc.

In some embodiments, the training samples may at least include historical statistics of the resident's family conditions. The label may be the difference between the actual infant population to be managed and the number of infants. The label may be manually marked.

Step 630, determining the construction plan of infants' management institutions based on the number of infant population be managed.

Infants' management institutions may be the institution for uniform management of infants. For example, infants' management institutions may include confinement centers and nurseries.

In some embodiments, infants' management institutions may have the corresponding carrying capacity of the number of infants. For example, the nursery may accommodate up to 300 infants. Based on the infant population to be managed, the number of infants' management institutions may be determined, so as to determine whether new infants' management institutions need to be built according to the current number of infants' management institutions.

FIG. 7 is a flowchart illustrating an exemplary process for determining a school construction plan according to some embodiments of the present disclosure. As shown in FIG. 7, the process 700 includes the following steps. In some embodiments, the process 700 may be executed by the management platform 230.

Step 710, predicting the number of school-age children population of the target area in the second future time period based on the population-related data.

The second future time period may be the time period used to predict the number of school-age children population. For example, the second future time period may be 2 months, 1 year, 2 years, etc. after the obtaining of population-related data. In some embodiments, the second future time period may be the same time corresponding to the future target time period such as 3 years after the obtaining of population-related data. In some embodiments, the second future time period may be the time included in the future target time period. For example, the future target time period corresponds to 3 years after the obtaining of the population-related data, and the second future time period is 1 year after the obtaining of the population-related data.

The number of school-age children population may be the number of children who are more than 3 years old in a certain region during a certain period of time in history.

In some embodiments, predicting the population of school-age children in the target area in the second future time period may be achieved through the following steps 711-714.

Step 711, obtaining the first population feature vector through processing the population-related data of the target area by the embedding layer. For more details about obtaining the first population feature vector through processing the population-related data of the target area by the embedding layer, please refer to the step 510 and the related descriptions. For more details about training the embedding layer, please refer to the FIG. 5 and the related descriptions.

Step 712, obtaining at least one second population feature vector through processing the population-related data of at least one sample area in the historical target time period by a second embedding layer.

For more details about obtaining a plurality of second population feature vectors through processing the population-related data of a plurality of sample areas in the historical target time period by embedding layer, please refers to the step 520 and the related descriptions. For more details about training the embedding layer, please refer to the FIG. 5 and the related descriptions.

In some embodiments, the input of the embedding layer may include the population-related data in the target area or sample area, and the output of the embedding layer may include the population feature vector. For example, when the input of the embedding layer is the population-related data in the target area, the output is the first population feature vector. When the input of the embedding layer is the population-related data of the sample area, the output is the second population feature vector.

In some embodiments, the input of the embedding layer may also include enrollment rates and basic development data. Basic development data may include economic growth, per capita income, age distribution, single children, educational resources, employment opportunities, living costs, etc. For more details about the entry rate, please refer to the step 610 and the related description.

In some embodiments, the embedding layer may be obtained by training the customized first model.

In some embodiments, the input of the first model may include the population-related data and basic development data of at least two different areas. The output of the first model may include the similarity between the population growth of the target area and the sample area. Specifically, the output of the first model may include the similarity between the proportion of the growing number of infants born in the target area and the sample area, the similarity between the proportion of the growing number of immigrant infants in the target area and the sample area, etc.

In some embodiments, the embedding layer may be trained with a plurality of labeled training samples. For example, a plurality of labeled training samples may be input into the initial embedding layer, a loss function is built based on the labels and the results of the initial embedding layer, and the parameters of the initial embedding layer are iteratively updated based on the loss function. The model training is completed when the loss function of the initial embedded layer meets the preset conditions, the training embedded layer is obtained. The preset conditions may be the convergence of the loss function, the number of iterations to the threshold, etc.

In some embodiments, the training sample may include at least data related to the birth population of the same historical target time period in different sample areas, and the basic development data corresponding to the above areas. The label may be the similarity between the proportion of the increase in the number of school-age children born in the sample area, and the similarity between the proportion of the increase in the number of school-age children in the sample area. The label may be obtained manually or determined similarity by calculating the Euclidean distance between the first population feature vector and the second population feature vector. It should be noted that the selection of labels may be selected based on the function of the model. For example, if only the first model is required to output the similarity between the proportions of the growing number of school-age children among the areas, the label of the training samples of the first model may only be the similarity between the proportions of the growing number of school-age children between the sample areas.

Step 713, determining a plurality of cluster centers through clustering a plurality of second population feature vectors.

For more details about determining a plurality of cluster centers through clustering a plurality of second population feature vectors, please refer to the step 530 and the related descriptions.

Step 714, taking the average growth rate of school-age children corresponding to the cluster center closest to the first population feature vector as the growth rate of school-age children in the target area.

For more details about the average growth rate of school-age children corresponding to the cluster center closest to the first population feature vector is taken as the growth rate of school-age children in the target area, please refer to the step 540 and the related descriptions.

In some embodiments, when the second future time period is greater than the first future time period, the number of school-age children population in the second future time period may include the number of infant population in the first time period. For example, when the first future time period is 1 year, the second future time period is 3 years, the current number of infants in the nursery is 5,000, and the number of new infants is predicted to be 1,000 through the process of 500, then the infants grow into school-age children in the second future time period, at this time, the population of school-age children may be the sum of the current number of infants in the nursery and the predicted number of new infants, i.e., 6,000.

In some embodiments, the management platform may adjust the predicted reduction range in the number of school-age children based on the difference in the length of the first future time period and the second future time period. For example, when the first future time period is 1 year, the second future time period is 3 years, the current number of infants in the nursery is 5,000, and the number of new infants is predicted to be 1,000 through the process of 500, but the infants are between 0-3 years old, not all infants may grow into school-aged children within 2 years. At this time, the number of school-age children needs to be reduced based on the above calculation method, that is, reducing the sum of the current number of infants in the nursery and the predicted number of new infants, which is 6000. The reduction method may be reduced according to the age distribution ratio. The age distribution ratio may be obtained through statistics. For example, the second future time period is 5 years, which is to predict the number of school-age children in the next 5 years, the reduction may be the sum of the current number of infants in the nursery and the predicted number of new infants minus the predicted number of infants aged 3 and below 3 years old in the first future time period.

Step 720, determining the school construction plan in the target area based on the number of school-age children population of the target area in the second future time period.

In some embodiments, schools may have the corresponding carrying capacity of the number of school-age children. For example, schools may accommodate up to 500 school-age children. Based on the number of school-age children, the number of schools may be determined, so as to determine whether to build new schools according to the current number of schools.

Through the process of the school construction plan described by some embodiments of the present disclosure, the process of school construction plan may be achieved, which may realize the future planning of schools and kindergartens based on deep learning. In addition, through the reduction of the prediction results, the statistical process is avoided by the statistical error caused by the entry and enrollment changes caused by the age growth of children, and the prediction results are more accurate.

Some embodiments of the present disclosure also disclose a non-transitory computer-readable storage medium for storing computer instructions, when reading the computer instructions in the storage medium, a computer implements the method for regional population management in smart cities based on the Internet of Things (IoT).

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for construction and management of children's management institutions in a smart city area based on an Internet of Things (IoT), wherein the method is realized based on a system for construction and management of children's management institutions in the smart city area based on the IoT, the system comprising a user platform, a service platform, a management platform, a sensor network platform, and an object platform, the system being a part of a server or implemented by the server, the user platform including a first terminal device and being used to obtain user needs, the service platform being used to communicate between the user platform and the management platform for providing users with input and output services, the management platform being configured as a second terminal device and used to achieve connection and collaboration between the user platform, the service platform, the sensor network platform, and the object platform, the sensor network platform being used to connect the management platform and the object platform for achieving functions of sensing information sensor communication and control information sensor communication, and the object platform being used for generation of sensor information and execution of control information, the method being executed by the management platform, the method comprising:

obtaining population-related data in a historical target time period through the object platform based on the sensor network platform;

predicting a number of children population in a future target time period based on the population-related data, wherein the population-related data includes data related to children population prediction within a certain area, wherein the population-related data includes at least one of marriage data, pregnant women file data, registration data of birth population, infant data in a nursery, and infant vaccination data;
wherein the predicting a number of children population in a future target time period based on the population-related data includes:
predicting a number of infant population of a target area in a first future time period based on the population-related data of the target area in the historical target time period; and predicting a number of school-age children population of the target area in a second future time period based on the population-related data; including:
obtaining a first population feature vector through processing the population-related data of the target area by a first embedding layer, wherein the first embedding layer is a model for extracting the first population feature vector, the first embedding layer includes a long short term memory network (LSTM) model, wherein an input of the first embedding layer includes the population-related data of the target area, and an output of the first embedding layer includes the first population feature vector of the target area, and the first population feature vector is a vector corresponding to a population change feature of the target area;
obtaining at least one second population feature vector through processing population-related data of at least one sample area in the historical target time period by a second embedding layer, wherein the second embedding layer includes the LSTM model, and the second population feature vector is a vector corresponding to a population number change feature in the sample area; wherein elements of the first population feature vector or the second population feature vector include a growth number and a proportion of infants born, a growth number and a proportion of immigrant infants, a growth number and a proportion of school-age children born, and a growth number and a proportion of immigrant school-age children, wherein the first embedding layer and the second embedding layer are obtained through a first training process based on a plurality of first training samples with first labels, wherein the first training samples include at least data related to the birth population of different sample areas in a same historical target time period, and basic development data corresponding to different sample areas in the same historical target time period, and the first labels include a similarity between a proportion of an increase in a number of school-age children born in the sample area, and a similarity between a proportion of an increase in a number of school-age children in the sample area, and the first labels are determined by calculating an Euclidean distance between the first population feature vector and the second population feature vector;
the first training process includes: inputting the plurality of first training samples with first labels into an initial first embedding layer or an initial second embedding layer, constructing a first loss function based on the first labels and output results of the initial first embedding layer or the initial second embedding layer, updating parameters of the initial first embedding layer or the initial second embedding layer based on the first loss function; and obtaining the first embedding layer or the second embedding layer until the first loss function of the initial first embedding layer or the initial second embedding layer meeting a first preset condition, wherein the first preset condition includes a convergence of the first loss function and a number of iterations reaching a first threshold;
obtaining at least one cluster center through clustering the at least one second population feature vector based on a cluster algorithm, wherein the cluster algorithm includes one of a K-means algorithm, density clustering, hierarchical clustering, Gaussian mixture clustering;
taking an average growth rate of the infants corresponding to a cluster center closest to the first population feature vector as a growth rate of the infants of the target area; and
taking an average growth rate of the school-age children corresponding to a cluster center closest to the first population feature vector as a growth rate of the school-age children of the target area;
determining a construction plan of the children's management institutions based on the number of children population, wherein the construction plan includes a number of the children's management institutions; and
feeding the construction plan back to a user through the user platform based on the service platform.

2. The method of claim 1, wherein the determining a construction plan of children's management institutions based on the number of children population includes:
adjusting the number of infant population based on family conditions of residents, wherein the adjusting the number of infant population based on family conditions of residents includes:
determining the adjusted number of infant population based on the number of infant population and an enrollment rate of the infant population, wherein the enrollment rate is a proportion of the infant population attending the nursery, the enrollment rate is obtained based on an adjustment factor, and the adjustment factor is a parameter that reflects a proportion of infant who attend or do not nursery;
determining a number of infant population to be managed based on the adjusted number of infant population; and
determining the construction plan of infant's management institutions based on the number of infant population to be managed.

3. The method of claim 1, wherein the determining a construction plan of children's management institutions based on the number of children population includes:
determining a school construction plan of the target area based on the number of school-age children population of the target area in the second future time period.

4. A system for construction and management of children's management institutions in a smart city area based on an Internet of Things (IoT), including a user platform, a service platform, a management platform, a sensor network platform, and an object platform, wherein the system is a part of a server or implemented by the server, the user platform including a first terminal device and being used to obtain user needs, the service platform being used to communicate between the user platform and the management platform for providing users with input and output services, the management platform being configured as a second terminal device and used to achieve connection and collaboration between the user platform, the service platform, the sensor network platform, and the object platform, the sensor network platform being used to connect the management platform and the object platform for achieving functions of sensing information sensor communication and control information sensor communication, and the object platform being used for generation of sensor information and execution of control information, wherein the management platform is configured to perform operations including:

obtaining population-related data in a historical target time period through the object platform based on the sensor network platform;

predicting a number of children population in a future target time period based on the population-related data, wherein the population-related data includes data related to children population prediction within a certain area, wherein the population-related data includes at least one of marriage data, pregnant women file data, registration data of birth population, infant data in a nursery, and infant vaccination data;

wherein the predicting a number of children population in a future target time period based on the population-related data includes:

predicting a number of infant population of a target area in a first future time period based on the population-related data of the target area in the historical target time period; and predicting a number of school-age children population of the target area in a second future time period based on the population-related data; including:

obtaining a first population feature vector through processing the population-related data of the target area by a first embedding layer, wherein the first embedding layer is a model for extracting the first population feature vector, the first embedding layer includes a long short term memory network (LSTM) model, wherein an input of the first embedding layer includes the population-related data of the target area, and an output of the first embedding layer includes the first population feature vector of the target area, and the first population feature vector is a vector corresponding to a population change feature of the target area;

obtaining at least one second population feature vector through processing population-related data of at least one sample area in the historical target time period by a second embedding layer, wherein the second embedding layer includes the LSTM model, and the second population feature vector is a vector corresponding to a population number change feature in the sample area; wherein elements of the first population feature vector or the second population feature vector include a growth number and a proportion of infants born, a growth number and a proportion of immigrant infants, a growth number and a proportion of school-age children born, and a growth number and a proportion of immigrant school-age children, wherein the first embedding layer and the second embedding layer are obtained through a first training process based on a plurality of first training samples with first labels, wherein the first training samples include at least data related to the birth population of different sample areas in a same historical target time period, and basic development data corresponding to different sample areas in the same historical target time period, and the first labels include a similarity between a proportion of an increase in a number of school-age children born in the sample area, and a similarity between a proportion of an increase in a number of school-age children in the sample area, and the first labels are determined by calculating an Euclidean distance between the first population feature vector and the second population feature vector;

the first training process includes: inputting the plurality of first training samples with first labels into an initial first embedding layer or an initial second embedding layer, constructing a first loss function based on the first labels and output results of the initial first embedding layer or the initial second embedding layer, updating parameters of the initial first embedding layer or the initial second embedding layer based on the first loss function; and obtaining the first embedding layer or the second embedding layer until the first loss function of the initial first embedding layer or the initial second embedding layer meeting a first preset condition, wherein the first preset condition includes a convergence of the first loss function and a number of iterations reaching a first threshold;

obtaining at least one cluster center through clustering the at least one second population feature vector based on a cluster algorithm, wherein the cluster algorithm includes one of a K-means algorithm, density clustering, hierarchical clustering, Gaussian mixture clustering;

taking an average growth rate of the infants corresponding to a cluster center closest to the first population feature vector as a growth rate of the infants of the target area; and taking an average growth rate of the school-age children corresponding to a cluster center closest to the first population feature vector as a growth rate of the school-age children of the target area;

determining a construction plan of the children's management institutions based on the number of children population, wherein the construction plan includes a number of the children's management institutions; and feeding the construction plan back to a user through the user platform based on the service platform.

5. The system of claim 4, wherein the management platform is further configured to:

adjusting the number of infant population based on family conditions of residents, wherein the adjusting the number of infant population based on family conditions of residents includes:

determining the adjusted number of infant population based on the number of infant population and an enrollment rate of the infant population, wherein the enrollment rate is a proportion of the infant population attending the nursery, the enrollment rate is obtained based on an adjustment factor and the adjustment factor is a parameter that reflects a proportion of infant who attend or do not nursery;

determining a number of infant population to be managed based on the adjusted number of infant population; and determining the construction plan of infant's management institutions based on the number of infant population to be managed.

6. The system of claim 4, wherein the management platform is further configured to:
determining a school construction plan of the target area based on the number of school-age children population of the target area in the second future time period.

7. A non-transitory computer-readable storage medium storing computer instructions, wherein when reading the computer instructions in the storage medium, a computer implements a method for construction and management of children's management institutions in a smart city area based on an Internet of Things (IoT) according to claim 1.

8. The method of claim 1, wherein the method further comprises:
adjusting the number of infant population based on family conditions of residents;
determining a number of infant population needing to be managed based on the adjusted number of infant population by a difference determination model, wherein an input of the difference determination model includes a statistics of resident's family conditions, and an output of the difference determination model includes a difference between an actual infant population needing to be managed and the number of infant population, the actual infant population needing to be managed is obtained by subtracting the difference between the number of infant population and the actual infant population needing to be managed from the number of infant population; wherein
the difference determination model is obtained through a second training process based on a plurality of second training samples with second labels, wherein the second training samples at least include historical statistics of the resident's family conditions, and the second labels include the difference between the actual infant population needing to be managed and the number of infant population;
the second training process includes: inputting the plurality of second training samples with second labels into an initial difference determination model, establishing a second loss function based on output results of the initial difference determination model and the second labels, updating parameters of the initial difference determination model based on the second loss function; and obtaining the difference determination model until the second loss function meeting a second preset condition, wherein the second preset condition includes a convergence of the second loss function and a number of iterations reaching a second threshold.

9. The method of claim 1, wherein the first embedding layer or the second embedding layer is further obtained by training a first model, wherein the first model is at least one of the LSTM model and a Deep Neural Networks (DNN) model, and the first model is a model including the first embedding layer, the second embedding layer, and an output layer; wherein
the first model is obtained through joint training based on training sample data, and the training sample data is historical population-related data and historical basic development data in a corresponding area;
the joint training includes: inputting the training sample data into the initial first embedding layer and the initial second embedding layer to output a population feature vector, inputting the population feature vector into an initial output layer to obtain a similarity of population growth in different areas, verifying an output of the initial output layer using a sample similarity; obtaining verification data of the population feature vector output by the initial first embedding layer and the initial second embedding layer using back-propagation feature of a neural network model, and training the initial first embedding layer and the initial second embedding layer using the verification data of the population feature vector as labels.

10. The system of claim 4, wherein the management platform is further configured to
adjusting the number of infant population based on family conditions of residents;
determining a number of infant population needing to be managed based on the adjusted number of infant population by a difference determination model, wherein an input of the difference determination model includes a statistics of resident's family conditions, and an output of the difference determination model includes a difference between an actual infant population needing to be managed and the number of infant population, the actual infant population needing to be managed is obtained by subtracting the difference between the number of infant population and the actual infant population needing to be managed from the number of infant population; wherein
the difference determination model is obtained through a second training process based on a plurality of second training samples with second labels, wherein the second training samples at least include historical statistics of the resident's family conditions, and the second labels include the difference between the actual infant population needing to be managed and the number of infant population;
the second training process includes: inputting the plurality of second training samples with second labels into an initial difference determination model, establishing a second loss function based on output results of the initial difference determination model and the second labels, updating parameters of the initial difference determination model based on the second loss function; and obtaining the difference determination model until the second loss function meeting a second preset condition, wherein the second preset condition includes a convergence of the second loss function and a number of iterations reaching a second threshold.

11. The system of claim 4, wherein the first embedding layer or the second embedding layer is further obtained by training a first model, wherein the first model is at least one of the LSTM model and a Deep Neural Networks (DNN) model, and the first model is a model including the first embedding layer, the second embedding layer, and an output layer; wherein
the first model is obtained through joint training based on training sample data, and the training sample data is historical population-related data and historical basic development data in a corresponding area;
the joint training includes: inputting the training sample data into the initial first embedding layer and the initial second embedding layer to output a population feature vector, inputting the population feature vector into an initial output layer to obtain a similarity of population growth in different areas, verifying an output of the initial output layer using a sample similarity; obtaining verification data of the population feature vector output by the initial first embedding layer and the initial second embedding layer using back-propagation feature of a neural network model, and training the initial first embedding layer and the initial second embedding layer using the verification data of the population feature vector as labels.

* * * * *